United States Patent
Bister et al.

(10) Patent No.: US 9,538,263 B2
(45) Date of Patent: Jan. 3, 2017

(54) SENSOR AND SENSOR NETWORK AND METHOD FOR THE OPERATION THEREOF

(75) Inventors: Oliver Bister, Alsdorf (DE); Matthias Gitzen, Aachen (DE); Luc Hamers, Aachen (DE); Goetz Langer, Roetgen (DE); Andreas Niewoehner, Aachen (DE); Diethelm Schueller, Aachen (DE); Thorsten Von Sydow, Aachen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1096 days.

(21) Appl. No.: 13/394,701

(22) PCT Filed: Aug. 25, 2010

(86) PCT No.: PCT/EP2010/062391
§ 371 (c)(1),
(2), (4) Date: Mar. 14, 2012

(87) PCT Pub. No.: WO2011/026765
PCT Pub. Date: Mar. 10, 2011

(65) Prior Publication Data
US 2012/0179424 A1    Jul. 12, 2012

(30) Foreign Application Priority Data
Sep. 7, 2009  (DE) .......... 10 2009 040 382

(51) Int. Cl.
*H03F 1/26* (2006.01)
*H04Q 9/00* (2006.01)
*G01D 21/00* (2006.01)

(52) U.S. Cl.
CPC ............. *H04Q 9/00* (2013.01); *G01D 21/00* (2013.01); *H04Q 2209/84* (2013.01)

(58) Field of Classification Search
None
See application file for complete search history.

(56) References Cited

U.S. PATENT DOCUMENTS

| 6,571,132 B1 | 5/2003 | Davis |
|---|---|---|
| 2003/0012168 A1 | 1/2003 | Elson |

(Continued)

FOREIGN PATENT DOCUMENTS

| DE | 195 19 164 A1 | 12/1995 |
|---|---|---|
| DE | 100 64 420 A1 | 7/2002 |

(Continued)

OTHER PUBLICATIONS

Moteiv Corporation: "Low Power Wireless Sensor Module" Nov. 13, 2006 (Nov. 13, 2006), Retrieved from teh Internet: URL:http://www.bandwavetech.com/download/tmote-sky-datsheet.pdf.

*Primary Examiner* — Aditya Bhat
(74) *Attorney, Agent, or Firm* — Simpson & Simpson, PLLC

(57) ABSTRACT

A sensor for measuring at least one measurement variable, a sensor network which has several sensors and a method for operating the sensor network. The sensor initially has a measurement variable sensor which is used to convert the measurement variable into an electric signal. A transducer is used to convert the electric signal into measurement data. The sensor has a first communication interface for transferring the measurement data and other data in accordance with a first protocol and a second communication interface for transferring the measurement data and other data in accordance with a second protocol. The sensor also has a data exchange unit for exchanging data between the transducer, the first communication interface and the second communication interface.

20 Claims, 2 Drawing Sheets

(56) References Cited

U.S. PATENT DOCUMENTS

| | | |
|---|---|---|
| 2009/0125252 A1 | 5/2009 | Silovic et al. |
| 2009/0316628 A1* | 12/2009 | Enns ................. H04L 12/40006 370/328 |
| 2011/0019621 A1* | 1/2011 | Funk et al. .................... 370/328 |
| 2011/0320050 A1* | 12/2011 | Petite et al. .................. 700/284 |

FOREIGN PATENT DOCUMENTS

| | | |
|---|---|---|
| DE | 101 60 395 A1 | 5/2003 |
| DE | 103 26 249 A1 | 2/2005 |
| DE | 10 2005 023 485 A1 | 11/2006 |
| WO | 2005/071364 A1 | 8/2005 |
| WO | 2007/002769 A1 | 1/2007 |

\* cited by examiner

SENSOR AND SENSOR NETWORK AND METHOD FOR THE OPERATION THEREOF

CROSS-REFERENCE TO RELATED APPLICATIONS

This application is a 371 of PCT/EP2010/062391 filed Aug. 25, 2010, which in turn claims the priority of DE 10 2009 040 382.5 filed Sep. 7, 2009. The priority of both applications is hereby claimed and both applications are incorporated by reference herein.

FIELD OF THE INVENTION

The present invention relates to a sensor for measuring at least one measurement variable. The invention also relates to a sensor network having a plurality of sensors and to a method for operating the sensor network.

BACKGROUND OF THE INVENTION

DE 103 26 249 A1 shows a measuring device having a control device for controlling functions of the measuring device and/or processing measurement data. The measuring device has a communication interface in order to be able to communicate with an identical measuring device.

DE 101 60 395 A1 shows a data transmission arrangement for selectively transmitting data from a multiplicity of measurement sections to at least one radio interrogator. The data generated by one or more transmitters are continuously forwarded to the radio interrogator by radio via a receiver and a radio transmitter and/or via an integrated receiving/transmitting unit.

DE 195 19 164 B4 discloses a decentralized apparatus for controlling operations for detection, transmission and control by seismic equipment installed in an investigation area. Seismic data are transmitted to a local central station from a multiplicity of local units. The seismic data are transmitted to a central station from one or more of the local central stations.

DE 100 64 420 B4 shows an apparatus for the decentralized detection and evaluation of physical events. One or more measuring elements are connected to an internal bus system and can be programmed via the latter. The data transmitted on the internal bus system can be emitted to the outside via at least one one-part or multi-part evaluation unit. The disadvantage of this solution is the increased outlay for the evaluation unit without which it is not possible to transmit the measurement data from the one or more measuring elements to the outside. The connection of the measuring element(s) to the internal bus system allows communication inside the apparatus, as a result of which measurement data and data for programming the measuring elements can be interchanged between the measuring elements and the evaluation unit.

SUMMARY OF THE INVENTION

On the basis of the prior art, the object of the invention is to be able to link sensors of a sensor network to one another and to the outside with little outlay.

The object is achieved by a sensor and a sensor network which are both disclosed herein. The invention also provides a method for operating a sensor network.

The sensor according to the invention is used to measure at least one measurement variable, for example a physical or chemical property, for example pressure, rotational speed, force, acceleration, temperature. The function according to the invention is not restricted to a particular type of measurement variable. The sensor first of all comprises at least one measurement variable pickup in order to convert the measurement variable into an electrical signal. At least one converter is used to convert the electrical signal into measurement data. The converter may be formed, for example, by an A/D converter which provides the digital measurement data. The sensor according to the invention has a first communication interface for transmitting the measurement data and further data according to a first protocol. It may be, for example, a proprietary bus connection, a serial interface according to RS422 or a WEAN interface. The sensor according to the invention also comprises a second communication interface for transmitting the measurement data and further data according to a second protocol. The second communication interface may also be any desired interface, for example a twisted pair network connection or a GSM interface. In any case, two different communication interfaces are available in the sensor according to the invention. The sensor also comprises a data interchange unit for interchanging data between the converter, the first communication interface and the second communication interface. The data to be interchanged are primarily measurement data, for example measurement data which were output by the converter, and measurement data which were transmitted from another sensor to the first communication interface. The data may also comprise, for example, control data for controlling the converter or process parameters.

The sensor according to the invention can be used universally inside a sensor network or alone. The first communication interface allows data to be transmitted between a plurality of sensors. The second communication interface allows transmission to an external device. In this case, both the measurement data which were measured by the sensor connected to the external device and those measurement data which were transmitted to this sensor from further sensors via the first communication interface are transmitted to the external device. There is no need for a device with a gateway function in order to transmit the measurement data from the one or more sensors according to the invention to an external device. In addition, it is possible to transmit further data, for example control data, from the external device to the sensor via the second communication interface, these control data being able to be transmitted to further sensors via the first communication interface.

This sensor according to the invention is particularly preferably in the form of a vibration sensor in order to be able to be used for state and process monitoring in a system. In this case, mechanical vibrations of the system to be monitored are the measurement variable.

The first communication interface and the second communication interface can be selected according to the requirements. The first communication interface is preferably suitable for transmitting measurement data and further data from a sensor according to the invention to a further sensor according to the invention. The second communication interface is preferably suitable for transmitting the measurement data and further data from a sensor according to the invention to an external device, for example to a control room. In this case, the first communication interface and the second communication interface may be based on different media, for example a cable connection, an optical waveguide connection or a radio connection.

In one preferred embodiment of the sensor according to the invention, the data interchange unit comprises a programmable processor. With the aid of the programmable processor, it is possible, for example, to adapt the interchange of data between the converter, the first communication interface and the second communication interface to changing requirements. Furthermore, the measurement data can be preprocessed and/or evaluated by the programmable processor.

The processor is preferably programmable via the first communication interface and/or the second communication interface. As a result, it is possible, for example, for the processor to be programmable from the control room, if the processor of a sensor according to the invention is programmable via the first communication interface, the processor can also be programmed when it is not directly connected to the control room via the second communication interface.

In another preferred embodiment of the sensor according to the invention, the converter is controllable via the first communication interface and/or via the second communication interface. This makes it possible to adapt, for example, the sampling frequency of the A/D converter to a changing measurement variable without having to make adjustments to the converter in situ for this purpose.

A sensor network according to the invention comprises a plurality of sensors according to the invention which are connected to one another via their first communication interfaces. The sensor network according to the invention also comprises a control room interface which is formed by the second communication interface of one of the sensors. Measurement data and further data can be transmitted inside the sensor network via the first communication interfaces of the sensors. In order to transmit the measurement data to outside the sensor network, the measurement data are transmitted via the control room interface. This sensor having the control room interface ensures communication between the sensor network and an external apparatus, for example a control room. There is no need for an additional apparatus with a gateway function in order to make it possible to transmit data between the sensor network and the control room.

A particular advantage of the sensor network according to the invention is that the sensor network can be modified with little outlay, for example by subsequently connecting further sensors according to the invention to the sensor network. The first communication interface of the sensors to be subsequently connected ensures that the measurement data from these sensors can be transmitted into the network in order to then be transmitted to an external apparatus via the control room interface. Another advantage of the sensor network according to the invention is that further data, for example control data or process data, can be transmitted inside the sensor network and from and to the outside via the control room interface. This makes it possible to adapt the sensors to changed measurement requirements via the external apparatus without the need to access individual sensors in situ for this purpose. This is particularly advantageous if the installation locations of the sensors are difficult to access.

The sensor network according to the invention is suitable for a wide variety of measuring tasks in terms of nature and technology, for example for acquiring seismic data or for monitoring complex technical apparatuses. It is also possible to provide individual technical components, for example pumps or fans, with a respective single sensor according to the invention, a sensor network according to the invention being created at the user end by the user interconnecting a plurality of these technical components.

The sensor network according to the invention can be designed to monitor complex natural or technical processes. In this case, the sensors of the network can be provided for a wide variety of measurement variables.

The method according to the invention is used to operate a sensor network according to the invention. The method first of all comprises a step in which measurement data from a first of the sensors are transmitted, via its first communication interface, to the sensor having the control room interface. In a further step, the measurement data from the first sensor and measurement data from the sensor having the control room interface are transmitted via the control room interface. These may be all measurement data from these sensors or selected measurement data from these sensors. The measurement data from the first sensor and from the sensor having the control room interface are preferably preprocessed and/or evaluated before they are transmitted via the control room interface. If the sensor network to be operated comprises further sensors in addition to the first sensor and the sensor having the control room interface, measurement data from the further sensors can also be preferably transmitted to the sensor having the control room interface via the first communication interfaces of the further sensors. This is preferably carried out in such a manner that the measurement data from a second of the sensors are transmitted, via its first communication interface, to the first sensor. The measurement data from the second sensor are also transmitted to the sensor having the control room interface via the first communication interface of the first sensor. Like the measurement data from the first sensor and the measurement data from the sensor having the control room interface, the measurement data from the second sensor are transmitted via the control room interface.

In one preferred embodiment of the method according to the invention, control data are also transmitted via the control room interface. The control data are transmitted by the sensor having the control room interface, via its first communication interface, to the first sensor where they are used to control the converter of the first sensor. With the aid of these method steps, the converter of the first sensor can be adapted to changing measurement requirements by means of control data which are transmitted to the sensor network from the outside via the control room interface. It goes without saying that control data may also be used in the sensor having the control room interface and in further sensors to control the converters there.

BRIEF DESCRIPTION OF THE DRAWINGS

A measuring system according to the prior art and a measuring system having a sensor network according to the invention are described below with reference to the drawing, in which.

DETAILED DESCRIPTION OF THE INVENTION

Figure 2:
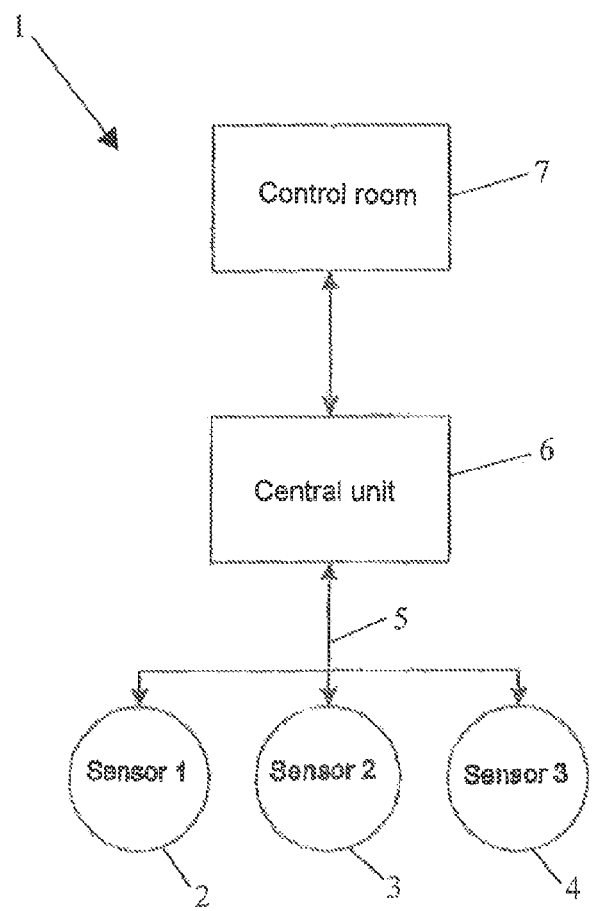
FIG. 2 shows a block diagram of a measuring system according to the prior art.

FIG. 2 shows a block diagram of a measuring system 1 according to the prior art. The measuring system 1 first of all comprises three sensors 2, 3, 4 which are each used to measure a measurement variable. The three sensors 2, 3, 4 have an interface 5 for outputting the measurement data, via which they are connected to a central unit 5. The connections between the central unit 6 and the three sensors 2, 3, 4 may have, for example, a linear or tree-like structure. The central unit 6 makes it possible for the measurement data from the three sensors 2, 3, 4 to be transmitted to a control room 7. Consequently, the central unit 6 is assigned a gateway function. Conversion is carried out between a protocol which is used in the interfaces of the sensors 2, 3, 4 and a protocol which is used in the interface of the control room 6. In many cases, the medium is converted at the same time. The central unit 5 is already required when only one of the sensors 2, 3, 4 is used.

Figure 1:
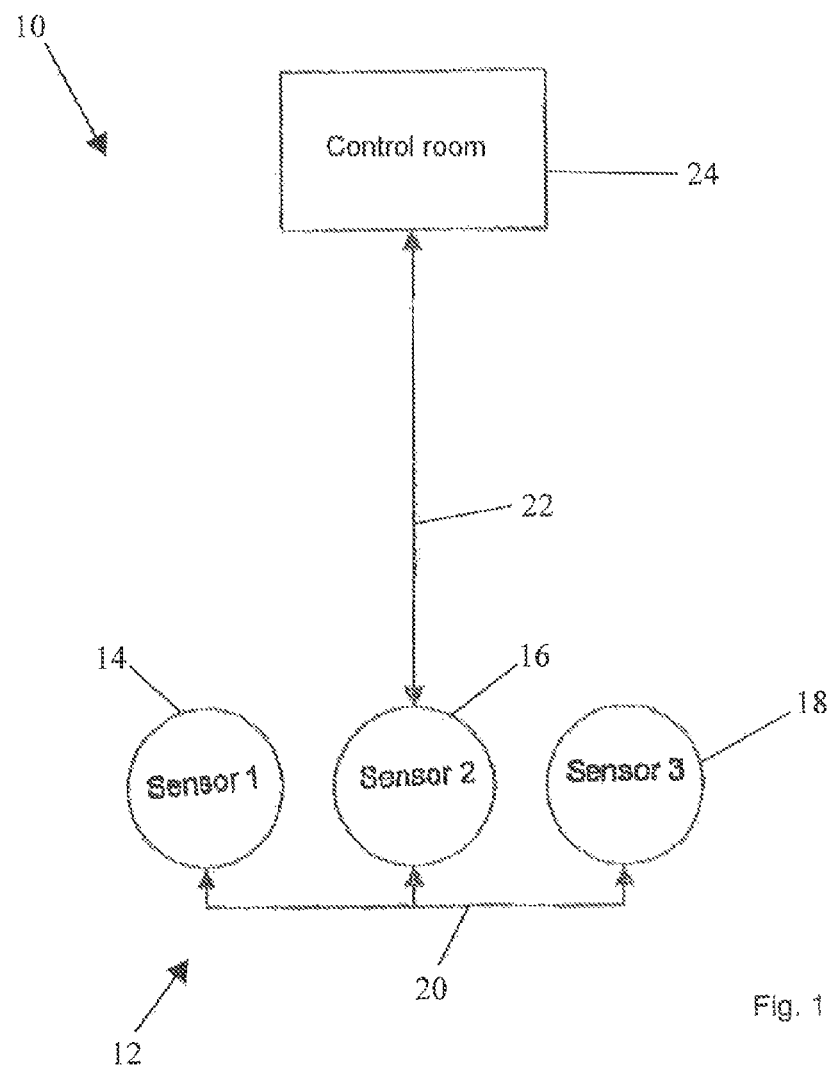
FIG. 1 shows a block diagram of a measuring system having a preferred embodiment of a sensor network according to the invention.

FIG. 1 shows a measuring system 10 having a preferred embodiment of a sensor network 12 according to the invention. In the example shown, the sensor network 12 consists of three sensors 14, 16, 18 according to the invention. The three sensors 14, 16, 18 have, on the one hand, a first communication interface 20 via which they are connected to one another. Measurement data from the first sensor 14 and from the third sensor 18 are transmitted to the second sensor 16. Control data for controlling the sensors 14, 16, 18 are also interchanged between the three sensors 14, 16, 18. The three sensors 14, 16, 18 each also have a second communication interface 22 which is illustrated only in the second sensor 16. The second communication interface 22 of the second sensor 16 forms a control room interface via which second the sensor 16 is connected to a control room 24. In contrast to the measuring system 1 according to the prior art shown in FIG. 2, there is no need for a central unit in order to collect the measurement data from the three sensors 14, 16, 18 and to convert said data according to the protocol used by the interface 22 of the control room 24. Control data for controlling the three sensors 14, 16, 18 can be transmitted from the control room 24 to the second sensor 16 and are forwarded to the first sensor 14 and to the third sensor 18 via the first communication interface 20 of the second sensor 16. In the simplest case, data can be transmitted in the first communication interface 20 of the sensors 14, 16, 18 and in the second communication interface 22 of the sensors 14, 16, 18 in a unidirectional manner. In this case, the first sensor 14 and the third sensor 18 transmit the measurement data to the second sensor 16, while the second sensor 16 transmits the measurement data from all sensors 14, 16, 18 to the control room 24. Data are preferably transmitted in the first communication interface 20 and in the second communication interface 22 of the sensors 14, 16, 18 in a bidirectional manner, as a result of which data transmission can also be safeguarded, for example.

The invention claimed is:

1. A sensor for measuring at least one measurement variable, comprising:
a measurement variable pick-up operatively arranged to measure the at least one measurement variable and convert the measurement variable into an electrical signal;
a converter operatively arranged to convert the electrical signal into measurement data;
a first communication interface operatively arranged to transmit the measurement data and further data according to a first protocol to and from a further sensor;
a second communication interface operatively arranged to:
collect the measurement data from the further sensor; and,
transmit the collected measurement data and further data from the further sensor according to a second protocol to an external device directly without a gateway function device; and,
a data interchange unit operatively arranged to:
interchange and adapt the measurement data between the converter, the first communication interface and the second communication interface according to changing requirements.

2. The sensor as claimed in claim 1, wherein the first communication interface and the second communication interface are based on different media.

3. The sensor as claimed in claim 1, wherein the data interchange unit comprises a programmable processor.

4. The sensor as claimed in claim 3, wherein the processor is programmable via the first communication interface and/or via the second communication interface.

5. The sensor as claimed in claim 1, wherein the converter is controllable via the first communication interface and/or via the second communication interface.

6. The sensor recited in claim 1, wherein the data to be interchanged is control data for controlling the converter or process parameters.

7. The sensor recited in claim 1, wherein the at least one measurement variable is mechanical vibrations.

8. The sensor recited in claim 1, wherein the data to be interchanged is control data for controlling the sensors.

9. A sensor network, comprising:
a plurality of sensors each having:
a measurement variable pickup operatively arranged to measure at least one measurement variable and convert the at least one measurement variable into an electrical signal;
a converter operatively arranged to convert the electrical signal into measurement data;
a first communication interface operatively arranged to transmit the measurement data and further data according to a first protocol to and from the plurality of sensors;
a second communication interface operatively arranged to:
collect the measurement data from the plurality of sensors; and,
transmit the collected measurement data and further data according to a second protocol to an external device directly without a gateway function device; and,
a data interchange unit operatively arranged to:
interchange and adapt the measurement data between the converter, the first communication interface and the second communication interface according to changing requirements, wherein:
the sensors are connected to one another via the first communication interface; and,
a control room interface, formed by the second communication interface of one of the sensors.

10. The sensor network as claimed in claim 9, wherein the sensors measure different measurement variables.

11. The sensor network recited in claim 9, wherein the data to be interchanged is control data for controlling the converter or process parameters.

12. The sensor network recited in claim 9, wherein the at least one measurement variable is mechanical vibrations.

13. The sensor network recited in claim 9, wherein the data to be interchanged is control data for controlling the sensors.

14. A method for operating a sensor network comprising sensors, which each have a measurement variable pick-up operatively arranged to convert the measurement variable into an electrical signal, a converter operatively arranged to convert the electrical signal into measurement data, a first communication interface, which connects the sensors to one another and transmits the measurement data and further data according to a first protocol among the sensors, a second communication interface operatively arranged to collect the measurement data from the sensors and transmit the measurement data and further data according to a second protocol to an external device directly without a gateway function device, and a data interchange unit operatively arranged to interchange and adapt the measurement data between the converter, the first communication interface and the second communication interface according to changing requirements, and a control room interface, which is formed by the second communication interface of one of the sensors, the method comprising the following steps:

transmitting the measurement data from a first of the sensors via the first communication interface of the first sensor to another of the sensors which has the control room interface; and, transmitting the measurement data from the first sensor and measurement data from the another sensor having the control interface via the control room interface.

15. The method as claimed in claim 14, further comprising the following steps:

transmitting the measurement data from a second of the sensors, via the first communication interface of the second sensor, to the first sensor;

transmitting the measurement data from the second sensor to the another sensor having the control room interface via the first communication interface of the first sensor; and, transmitting the measurement data from the second sensor via the control room interface.

16. The method as claimed in claim 14, further comprising the following steps:

transmitting control data via the control room interface;

transmitting the control data by the another sensor having the control room interface, via the first communication interface of the another sensor, to the first sensor; and, using the control data in the first sensor to control the converter.

17. The method as claimed in one of claim 14, including preprocessing and/or evaluating the measurement data from the first sensor and the measurement data from the another sensor having the control room interface before the measurement data from the first sensor and the measurement data from the another sensor having the control room interface are transmitted via the control room interface.

18. The method recited in claim 14, wherein the data to be interchanged is control data for controlling the converter or process parameters.

19. The method recited in claim 14, wherein the at least one measurement variable is mechanical vibrations.

20. The method recited in claim 14, wherein the data to be interchanged is control data for controlling the sensors.

\* \* \* \* \*